United States Patent
Higuchi et al.

(10) Patent No.: US 11,780,943 B2
(45) Date of Patent: Oct. 10, 2023

(54) METHOD FOR PRODUCING MODIFIED POLYTETRAFLUOROETHYLENE, METHOD FOR PRODUCING MODIFIED POLYTETRAFLUOROETHYLENE POWDER, AND METHOD FOR PRODUCING STRETCHED POROUS MATERIAL

(71) Applicant: AGC Inc., Tokyo (JP)

(72) Inventors: Shinya Higuchi, Chiyoda (JP); Shiro Ebata, Chiyoda-ku (JP); Takehiro Kose, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 629 days.

(21) Appl. No.: 17/021,129

(22) Filed: Sep. 15, 2020

(65) Prior Publication Data

US 2021/0009732 A1 Jan. 14, 2021

Related U.S. Application Data

(63) Continuation of application No. PCT/JP2019/017673, filed on Apr. 25, 2019.

(30) Foreign Application Priority Data

Apr. 27, 2018 (JP) .................. 2018-087280

(51) Int. Cl.
    *C08F 214/26* (2006.01)
    *C08F 2/10* (2006.01)
    *C08J 3/16* (2006.01)

(52) U.S. Cl.
    CPC .......... *C08F 214/265* (2013.01); *C08F 2/10* (2013.01); *C08J 3/16* (2013.01); *C08J 2327/22* (2013.01)

(58) Field of Classification Search
    None
    See application file for complete search history.

(56) References Cited

U.S. PATENT DOCUMENTS

| 8,697,822 B2 | 4/2014 | Durali et al. |
| 2007/0004848 A1* | 1/2007 | Hintzer .................. C08L 27/18 524/544 |
| 2010/0036073 A1* | 2/2010 | Aten ...................... C08F 214/26 526/253 |
| 2015/0148481 A1* | 5/2015 | Brothers .................. C08F 2/18 524/742 |

FOREIGN PATENT DOCUMENTS

| CN | 102112504 A | 6/2011 |
| JP | 2016-537499 A | 12/2016 |
| RU | 2 268 895 C2 | 1/2006 |
| RU | 2 618 222 C2 | 5/2017 |

OTHER PUBLICATIONS

Siegel, et al. "Molecular design principles of ionic liquids with a sulfonyl fluoride moiety", New J. Chem, 45, 2443-2452, 2021 (Year: 2021).*
International Search Report dated Aug. 6, 2019 in PCT/JP2019/017673 filed Apr. 25, 2019, 2 pages.

* cited by examiner

*Primary Examiner* — Christopher M Rodd
(74) *Attorney, Agent, or Firm* — Oblon, McClelland, Maier & Neustadt, L.L.P.

(57) ABSTRACT

To provide a method for producing modified polytetrafluoroethylene, in which formation of a fluorinated oligomer as a by-product is little. A method for producing modified polytetrafluoroethylene which contains substantially no $C_{6-34}$ fluorinated oligomer containing hydrophilic functional groups and which contains substantially no fluorinated surfactant, the method comprising conducting copolymerization of tetrafluoroethylene and a monomer having a polar group, in a liquid dispersion 1 comprising a polymer containing units derived from a non-fluorinated monomer and an aqueous medium, or in a solution 2 obtainable by mixing at least one member selected from the group consisting of a polyalkylene oxide compound and a hydrocarbon-containing surfactant, with an oxidizing agent, in an aqueous medium, under such a condition that the amount of the monomer having a polar group to be used, is at most 0.150 mass % to the whole amount of tetrafluoroethylene, to obtain modified polytetrafluoroethylene.

14 Claims, No Drawings

METHOD FOR PRODUCING MODIFIED POLYTETRAFLUOROETHYLENE, METHOD FOR PRODUCING MODIFIED POLYTETRAFLUOROETHYLENE POWDER, AND METHOD FOR PRODUCING STRETCHED POROUS MATERIAL

TECHNICAL FIELD

The present invention relates to a method for producing modified polytetrafluoroethylene, a method for producing a modified polytetrafluoroethylene powder, and a method for producing a stretched porous material.

BACKGROUND ART

Polytetrafluoroethylene is used in various applications because of its excellent properties.

Heretofore, at the time of the production of polytetrafluoroethylene, a fluorinated surfactant such as perfluorooctyl sulfonic acid has been used. However, from an environmental point of view, it has been desired to refrain from using a fluorinated surfactant.

Therefore, as one of new methods for producing polytetrafluoroethylene, a method of using a hydrocarbon-containing surfactant such as sodium dodecyl sulfate at the time of polymerizing tetrafluoroethylene has been proposed (Patent Document 1).

PRIOR ART DOCUMENT

Patent Document

Patent Document 1: JP-A-2016-537499

DISCLOSURE OF INVENTION

Technical Problem

On the other hand, when a hydrocarbon-containing surfactant such as sodium dodecyl sulfate is used, a chain transfer reaction occurs with respect to the hydrocarbon-containing surfactant at the time of polymerizing tetrafluoroethylene. Therefore, in the method of using the hydrocarbon-containing surfactant, presence of a fluorinated oligomer containing hydrophilic functional groups having various chain length distributions, has been confirmed in the product, which has never been confirmed by the conventional method of using the fluorinated surfactant. This fluorinated oligomer is a by-product formed by the hydrocarbon-containing surfactant serving as the starting point of the chain transfer, as described above. The presence of such a by-product is likely to bring about deterioration of the performance of polytetrafluoroethylene and is undesirable also from the environmental viewpoint.

An object of the present invention is to provide a method for producing modified polytetrafluoroethylene, in which formation of a fluorinated oligomer containing hydrophilic functional groups as a by-product is little.

Another object of the present invention is to provide a method for producing a modified polytetrafluoroethylene powder and a method for producing a stretched porous material.

Solution to Problem

As a result of extensive studies, the present inventors have found it possible to accomplish the above objects by the following constructions.

(1) A method for producing modified polytetrafluoroethylene, which comprises conducting copolymerization of tetrafluoroethylene and a monomer having a polar group, in a dispersion 1 comprising a polymer containing units based on a non-fluorinated monomer, and an aqueous medium, under such a condition that the amount of the monomer having a polar group to be used, is at most 0.150 mass % to the whole amount of tetrafluoroethylene to be supplied to the polymerization system.

(2) The method for producing modified polytetrafluoroethylene according to (1), wherein the polar group is a group represented by the formula (A) as described below or a group represented by the formula (B) as described below.

(3) The method for producing modified polytetrafluoroethylene according to (2), wherein the monomer having a polar group is a monomer represented by the formula (3) as described below.

(4) The method for producing modified polytetrafluoroethylene according to any one of (1) to (3), wherein in the aqueous medium, polymerization of the non-fluorinated monomer is conducted, and then in the dispersion 1 comprising the polymer containing units based on the non-fluorinated monomer and the aqueous medium, copolymerization of the tetrafluoroethylene and the monomer having a polar group is conducted.

(5) The method for producing modified polytetrafluoroethylene according to any one of (1) to (4), wherein in the non-fluorinated monomer is a monomer represented by the formula (1) as described below.

(6) The method for producing modified polytetrafluoroethylene according to any one of (1) to (5), wherein at the time of the copolymerization of the tetrafluoroethylene and the monomer having a polar group, a polymerization initiator is used, and the amount of the polymerization initiator to be used, is at least 0.10 mass % to the whole amount of tetrafluoroethylene to be supplied to the polymerization system.

(7) The method for producing modified polytetrafluoroethylene according to any one of (1) to (6), wherein the amount of the monomer having a polar group to be used, is at most 0.150 mol % to the whole amount of tetrafluoroethylene to be supplied to the polymerization system.

(8) A method for producing modified polytetrafluoroethylene, which comprises conducting copolymerization of tetrafluoroethylene and a monomer having a polar group, in a dispersion 2 obtainable by mixing at least one member selected from the group consisting of a polyalkylene oxide compound and a hydrocarbon-containing surfactant, with an oxidizing agent, in an aqueous medium, under such a condition that the amount of the monomer having a polar group to be used, is at most 0.150 mass % to the whole amount of tetrafluoroethylene to be supplied to the polymerization system, to obtain modified polytetrafluoroethylene.

(9) The method for producing modified polytetrafluoroethylene according to (8), wherein copolymerization of the tetrafluoroethylene and the monomer having a polar group is conducted in the dispersion 2, and the polyalkylene oxide compound is a compound represented by the formula (2) as described below.

(10) The method for producing modified polytetrafluoroethylene according to (8) or (9), wherein a polymerization initiator is used at the time of the copolymerization of the tetrafluoroethylene and the monomer having a polar group, and the amount of the polymerization initiator to be used is at least 0.10 mass % to the whole amount of tetrafluoroethylene to be supplied to the polymerization system.

(11) The method for producing modified polytetrafluoroethylene according to any one of (8) to (10), wherein the amount of the monomer having a polar group to be used, is at most 0.150 mol % to the whole amount of tetrafluoroethylene to be supplied to the polymerization system.

(12) A method for producing a modified polytetrafluoroethylene powder, which comprises producing an aqueous dispersion in which the modified polytetrafluoroethylene obtained by the method as defined in any one of (1) to (11) is dispersed in the form of particles, and coagulating the particulate modified polytetrafluoroethylene to obtain a modified polytetrafluoroethylene powder.

(13) A modified polytetrafluoroethylene powder, in which units based on a monomer having a polar group, are from 0.005 to 0.150 mol %, to units based on tetrafluoroethylene, of which the standard specific gravity is at most 2.230, and which contains substantially no $C_{6\text{-}34}$ fluorinated oligomer containing hydrophilic functional groups and no fluorinated surfactant.

(14) A method for producing a stretched porous material, which comprises producing a modified polytetrafluoroethylene powder by the method as defined in (12), paste-extruding the modified polytetrafluoroethylene powder to obtain an extruded bead, and stretching the extruded bead to obtain a stretched porous material.

Advantageous Effects of Invention

According to the present invention, it is possible to provide a method for producing modified polytetrafluoroethylene in which formation of a fluorinated oligomer containing hydrophilic functional groups as a by-product is little.

Further, according to the present invention, it is possible to provide a method for producing a modified polytetrafluoroethylene powder and a method for producing a stretched porous material.

DESCRIPTION OF EMBODIMENTS

The meanings of the terms in the present invention are as follows.

A "unit" is a general term for an atomic group derived from one molecule of a monomer, which is directly formed by polymerization of the monomer.

A feature of the method for producing modified polytetrafluoroethylene (hereinafter referred to also as "modified PTFE") of the present invention may be that polymerization of tetrafluoroethylene (hereinafter referred to also as "TFE") is conducted together with a monomer having a polar group (hereinafter referred to also as a "specific monomer") in a dispersion 1 comprising a polymer containing units based on a non-fluorinated monomer (hereinafter referred to also as a "specific polymer") and an aqueous medium, or in a dispersion 2 obtainable by mixing at least one member selected from the group consisting of a polyalkylene oxide compound and a hydrocarbon-containing surfactant, and an oxidizing agent, in an aqueous medium.

The dispersion 1 and the dispersion 2 are capable of providing a hydrophobic environment where polymerization of TFE can proceed satisfactorily, and further, the specific monomer plays a role of stably promoting polymerization of TFE while suppressing the occurrence of chain transfer. As a result, it is possible to produce modified PTFE showing a good molecular weight while suppressing formation of a fluorinated oligomer containing hydrophilic functional groups as a by-product. Further, according to the production method of the present invention, modified PTFE can be produced without using a hydrocarbon-containing surfactant at the time of polymerizing TFE.

Further, in the fluorinated oligomer containing hydrophilic functional groups, mainly an oligomer having $CF_2$ linked to have about 6 to 34 carbon atoms is included.

Such a fluorinated oligomer having hydrophilic functional groups and fluorinated surfactant, are substantially not included in the modified polytetrafluoroethylene of the present invention. "Substantially not included" is a value lower than 3 ppb being the analytical detection limit.

It is presumed that the specific polymer substitutes at least a part of the action and effect in the case of using the fluorinated surfactant for e.g. the dispersibility of PTFE to be formed.

The amount of the specific polymer in the modified PTFE in the present invention is very small as described later, and therefore, the amount of the specific polymer in the aqueous medium containing the specific polymer in which TFE is polymerized, is also very small. Therefore, the aqueous medium containing the specific polymer in which TFE is polymerized, is preferably an aqueous medium obtained by polymerizing a non-fluorinated monomer in the aqueous medium. In such a case, the specific polymer in the aqueous medium is considered to be dispersed in the aqueous medium in a particulate form as described later.

The aqueous medium containing the specific polymer to be used for the polymerization of TFE, may be an aqueous medium obtainable by polymerizing a non-fluorinated monomer in the aqueous medium, or may be an aqueous medium obtainable by further diluting the aqueous medium obtainable by polymerizing a non-fluorinated monomer in the aqueous medium, with an aqueous medium.

In a case where the aqueous medium obtainable by polymerizing the non-fluorinated monomer in the aqueous medium, is used as it is, it is preferred that the non-fluorinated monomer is polymerized in a polymerization system (in a polymerization container, etc.) for polymerizing TFE, and then, polymerization of TFE is carried out in the same polymerization system. In a case where the aqueous medium obtainable by polymerizing a non-fluorinated monomer in the aqueous medium is to be used by diluting it, polymerization of TFE may be carried out in the same polymerization system, or polymerization of TFE may be carried out in another polymerization system.

First Embodiment

As a first embodiment of the method for producing modified PTFE, an embodiment having the following two steps may be mentioned.

Step A1: a step of conducting polymerization of a non-fluorinated monomer in an aqueous medium to obtain a dispersion 1 containing a specific polymer and the aqueous medium Step A2: a step of conducting copolymerization of TFE and the specific monomer in the dispersion 1 under such a condition that the amount of the specific monomer to be used is at most 0.150 mass % to the whole amount of TFE to be supplied to the polymerization system, to obtain modified PTFE.

The aqueous medium containing the specific polymer obtained in the step A1 as described above, may be diluted with an aqueous medium and used as the aqueous medium containing the specific polymer in step A2. Further, in step A2, before starting the copolymerization of TFE and the specific monomer, additives as described later may be added to the dispersion 1 to carry out the copolymerization. In some cases, the additives to be used in the copolymerization may be added to the aqueous medium to be used in step A1, to obtain the aqueous medium containing the additives and the specific polymer in step A1, and the obtained aqueous medium may be used as the aqueous medium for step A2.

Hereinafter, the present invention will be described in detail by taking the above-mentioned preferred embodiment as an example.

<Step A1>

In the following, first, materials to be used in step A1 will be described in detail, and then, the procedure of step A1 will be described in detail.

(Non-Fluorinated Monomer)

The non-fluorinated monomer is a monomer containing no fluorine atom.

The non-fluorinated monomer usually has a polymerizable group, and the number of polymerizable groups is preferably from 1 to 3, more preferably 1.

The polymerizable group is preferably an ethylenically unsaturated group. More specifically, an acryloyl group, a methacryloyl group, a vinyl ether group, a vinyl ester group, a vinyl group or an allyl group may be mentioned, and an acryloyl group, a methacryloyl group, a vinyl ester group or a vinyl ether group is preferred.

The non-fluorinated monomer is preferably a monomer represented by the formula (1).

$CH_2=CR_{11}-L^1-R^{12}$      Formula (1)

$R^{11}$ represents a hydrogen atom or an alkyl group. The number of carbon atoms in the alkyl group is preferably from 1 to 3, more preferably 1.

$L^1$ represents a single bond, —CO—O—*, —O—CO—* or —O—. * represents a bonding position to $R^{12}$. For example, when $L^1$ is —CO—O—*, the formula (1) represents $CH_2=CR^{11}$—CO—O—$R^{12}$.

$R^{12}$ represents a hydrogen atom, an alkyl group, an alkenyl group or a nitrile group. However, when $L^1$ is a single bond, $R^{12}$ is a nitrile group.

The number of carbon atoms in the alkyl group and the alkenyl group is preferably from 1 to 10, more preferably from 1 to 6, further preferably from 1 to 4.

The alkyl group may be linear or cyclic. When the alkyl group is cyclic, it corresponds to a cycloalkyl group.

The alkenyl group may be linear or cyclic.

The monomer represented by the formula (1) is preferably a monomer selected from the group consisting of a monomer represented by the formula (1-1), a monomer represented by the formula (1-2), a monomer represented by the formula (1-3) and a monomer represented by the formula (1-4).

$CH_2=CR^{11}$—CO—O—$R^{13}$      Formula (1-1)

$CH_2=CR^{11}$—O—CO—$R^{14}$      Formula (1-2)

$CH_2=CR^{11}$—O—$R^{15}$      Formula (1-3)

$CH_2=CR^{11}$—$R^{16}$      Formula (1-4)

$R^{11}$ is as described above.

$R^{13}$ represents a hydrogen atom, an alkyl group or an alkenyl group, and is preferably a $C_{1-6}$ alkyl group or a $C_{1-6}$ alkenyl group.

$R^{14}$ represents an alkyl group, and is preferably a $C_{1-3}$ alkyl group, more preferably a methyl group.

$R^{15}$ represents an alkyl group, and is preferably a linear alkyl group or a cyclic alkyl group.

$R^{16}$ represents a nitrile group.

The non-fluorinated monomer may, for example, be methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, or cyclohexyl vinyl ether.

As the non-fluorinated monomer, one type may be used alone, or two or more types may be used in combination.

As the non-fluorinated monomer, a monomer represented by the above formula (1-1) and a monomer represented by the above formula (1-2), are more preferred, and a monomer represented by the above formula (1-1) wherein $R^{13}$ is an alkyl group, is particularly preferred. The monomer represented by the formula (1-1) and the monomer represented by the formula (1-2) have an ester group or a carboxy group, being a water-affinity group, whereby such a monomer or its polymer has a water affinity. Therefore, it is considered that such a monomer or its polymer is stably dispersed in an aqueous medium without requiring a surfactant, especially at a low concentration.

(Specific Polymer)

The specific polymer is composed of a polymer containing units based on the non-fluorinated monomer.

The polymer usually contains only units based on the non-fluorinated monomer, but may contain units based on a fluorinated monomer within a range not to impair the effects of the present invention. The fluorinated monomer is a monomer having fluorine atoms, and, for example, TFE may be mentioned.

In a case where in step A1, a dispersion 1 containing the specific polymer and the aqueous medium is produced, and then, polymerization of TFE in step A2 is continuously conducted in the dispersion 1 containing the specific polymer and the aqueous medium in the polymerization system used in the step A1, there may be a case where the specific polymer in the course of polymerization or the specific polymer-containing aqueous medium containing an unreacted non-fluorinated monomer may be used in step A2. Further, there may be a case where the atmosphere in the polymerization system of step A1 may be made to be a TFE-containing atmosphere in consideration of step A2. In such a case, it is considered that part of the specific polymer in step A2 may be a polymer containing TFE units.

From another perspective, the modified PTFE particles obtainable in step A2 are not limited to particles composed of a physical mixture of the specific polymer and PTFE, but are considered to be particles containing a TFE co-polymer having units based on the non-fluorinated monomer.

The content of units based on the non-fluorinated monomer in the polymer is preferably at least 90 mass %, more preferably at least 95 mass %, to all units in the polymer. The upper limit is 100 mass %.

(Aqueous Medium)

The aqueous medium may, for example, be water, or a mixture of water and a water-soluble organic solvent.

The water-soluble organic solvent may, for example, be tert-butanol, propylene glycol or dipropylene glycol. In the case of a mixture of water and a water-soluble organic solvent, the water-soluble organic solvent concentration is preferably at most 10 mass %.

The aqueous medium is preferably water alone.

(Polymerization Initiator)

In step A1, a polymerization initiator may be used. That is, a polymerization initiator may be used at the time of the polymerization of the non-fluorinated monomer.

As the polymerization initiator, a water-soluble radical initiator or a water-soluble redox catalyst is preferred.

As the water-soluble radical initiator, a persulfate such as ammonium persulfate or potassium persulfate, a water-soluble organic peroxide such as disuccinic acid peroxide, bisglutaric acid peroxide or tert-butyl hydroperoxide, is preferred.

As the water-soluble redox catalyst, preferred is a combination of an oxidizing agent such as bromic acid or a salt thereof, chloric acid or a salt thereof, persulfuric acid or a salt thereof, permanganic acid or a salt thereof, or hydrogen peroxide, and a reducing agent such as sulfurous acid or a salt thereof, hydrogen sulfite or a salt thereof, thiosulfuric acid or a salt thereof, or an organic acid. Among them, a combination of bromic acid or a salt thereof and sulfurous acid or a salt thereof (e.g. ammonium sulfite), and a combination of permanganic acid or a salt thereof (e.g. potassium permanganate) and oxalic acid, are more preferred.

As the polymerization initiator, ammonium persulfate alone or a mixed system of a persulfate and disuccinic acid peroxide is preferred, and ammonium persulfate alone or a mixed system of ammonium persulfate and disuccinic acid peroxide is more preferred.

As the polymerization initiator, one type may be used alone, or two or more types may be used in combination.

As a method for charging the polymerization initiator, the entire amount thereof may be charged into the reaction system before starting the polymerization reaction, or it may be continuously or intermittently added to the reaction system.

(Procedure of Step A1)

In step A1, polymerization of the non-fluorinated monomer is conducted in an aqueous medium. Specifically, it is preferred that the non-fluorinated monomer and the aqueous medium are mixed, and polymerization of the non-fluorinated monomer is conducted in the obtained mixed liquid.

The amount of the non-fluorinated monomer to be used, is preferably from 0.001 to 0.050 mass %, more preferably from 0.001 to 0.020 mass %, further preferably from 0.002 to 0.020 mass %, particularly preferably from 0.003 to 0.016 mass %, to the whole amount of TFE to be used in step A2 as described later.

Here, as the method of charging the non-fluorinated monomer, initial batch addition is preferred, such that its whole amount is charged in the reaction system before initiating the polymerization reaction.

The amount of the non-fluorinated monomer to be used, is preferably from 0.0005 to 0.050 mol %, more preferably from 0.0005 to 0.020 mol %, further preferably from 0.001 to 0.020 mol %, particularly preferably from 0.002 to 0.015 mol %, to the whole amount of TFE to be used in step A2 as described later.

Here, as the method of charging the non-fluorinated monomer, initial batch addition is preferred such that its whole amount is charged in the reaction system before initiating the polymerization reaction.

The content of the non-fluorinated monomer in the dispersion obtainable by mixing the non-fluorinated monomer and the aqueous medium, is preferably from 0.0005 to 0.0080 mass %, more preferably from 0.0005 to 0.0030 mass %, to the whole mass of the dispersion.

Since the non-fluorinated monomer is polymerized usually in its whole amount to form a specific polymer, the specific polymer concentration in the obtained specific polymer-containing aqueous medium falls within the above-mentioned numerical range.

The above non-fluorinated monomer concentration and specific polymer concentration are concentrations when the obtained specific polymer-containing aqueous medium is used in step A2 without being diluted with an aqueous medium. In a case where the obtained specific polymer-containing aqueous medium is diluted with an aqueous medium to have the above-mentioned specific polymer concentration, and the diluted solution is used in step 2, in step A1, the specific polymer with a high concentration corresponding to the dilution ratio, is produced. The dilution ratio is not particularly limited, but is preferably at most 10 times.

The amount of the polymerization initiator to be used, is preferably from 0.2 to 1,000 mass %, more preferably from 0.2 to 500 mass %, to the whole amount of the non-fluorinated monomer.

The amount of the polymerization initiator to be used, is preferably from 0.1 to 1,000 mol %, more preferably from 0.1 to 300 mol %, to the whole amount of the non-fluorinated monomer.

The polymerization temperature of the non-fluorinated monomer is preferably from 10 to 95° C., more preferably from 50 to 90° C. The polymerization time is preferably from 5 to 400 minutes, more preferably from 5 to 300 minutes, further preferably from 5 to 200 minutes.

The pressure condition during the polymerization is preferably a reduced pressure condition or a normal pressure condition. Particularly, from 0 to 2.0 MPa is preferred, from 0 to 1.0 MPa is more preferred, and from 0 to 0.5 MPa is further preferred.

Further, the polymerization may be carried out by making the atmosphere during the polymerization to be a TFE atmosphere. Here, normally, the polymerization of the non-fluorinated monomer in the aqueous medium proceeds preferentially over the polymerization of TFE.

The specific polymer is obtainable by the above-described step A1.

The specific polymer is considered to be dispersed in the aqueous medium in the form of particles. It is assumed that at the time of the copolymerization of TFE and the specific monomer in step A2 as described later, although the specific polymer is not an emulsifier, due to the balance of the interfacial tension to both the aqueous medium and modified PTFE particles, the specific polymer is present at the boundary of both, and thus contributes to the stabilization of dispersion of modified PTFE particles in the aqueous medium.

The particle size of the specific polymer particles is preferably from 0.1 to 100 nm, more preferably from 0.1 to 50 nm.

<Step A2>

Step A2 is a step of conducting copolymerization of TFE and the specific monomer in the dispersion 1 under such a condition that the amount of the specific monomer to be used, to the whole amount of TFE, is at most 0.150 mass %, to obtain modified PTFE. It is assumed that by carrying out this step, modified PTFE particles dispersion-stabilized in the aqueous medium by the specific polymer, will have the surface activity on the surface improved due to the copolymerization with the specific monomer. As a result, it is assumed that increase in molecular weight of modified PTFE is promoted, and such will contribute to the improvement of the stretched physical properties, etc.

In the following, first, materials to be used in step A2 will be described in detail, and then, the procedure of step A2 will be described in detail.

(Aqueous Medium Containing Specific Polymer)

As the aqueous medium containing the specific polymer in step A2, the aqueous medium containing the specific polymer obtained in step A1, or an aqueous medium containing the specific polymer, obtainable by diluting the aqueous medium containing the specific polymer obtained in step A1 by an aqueous medium, will be used.

The amount of the specific polymer in the specific polymer-containing aqueous medium to be used for the polymerization of TFE, is preferably from 0.001 to 0.050 mass %, more preferably from 0.001 to 0.020 mass %, further preferably from 0.002 to 0.020 mass %, still further preferably from 0.003 to 0.016 mass %, particularly preferably from 0.003 to 0.010 mass %, to the whole amount of TFE to be supplied to the polymerization system.

The aqueous medium may, for example, be water, or a mixture of water and a water-soluble organic solvent. As the water-soluble organic solvent, the solvents exemplified in step A1 may be mentioned.

In a case where the specific polymer-containing aqueous medium obtained in step A1 is used as it is without dilution, the aqueous medium in step A2 is the same as the aqueous medium in step A1. In a case where the specific polymer-containing aqueous medium obtained in step A1 is diluted and then used, the same applies in a case where the aqueous medium to be diluted is the same aqueous medium as used in step A1.

(Specific Monomer)

The specific monomer is used at the time of copolymerization with TFE. Since the polar group in the specific monomer interacts with the aqueous medium, it is assumed that it is located between TFE and the aqueous medium at the time of polymerization of TFE and exhibits a surfactant-like function. As a result, the polymerization of TFE proceeds well, and occurrence of chain transfer will be suppressed.

The polar group contained in the specific monomer may, for example, be a sulfonic acid group, a sulfonate group, a carboxylic acid group, a carboxylate group, a phosphonic acid group, or a phosphonate group. Among them, the group represented by the formula (A) or the group represented by the formula (B) is preferred, and the group represented by the formula (A) is more preferred, in that formation of the fluorinated oligomer will be further suppressed.

—SO$_3$M    Formula (A)

—COOM    Formula (B)

In the formula (A) and the formula (B), M represents a hydrogen atom, NH$_4$ or an alkali metal atom. The alkali metal atom may, for example, be a lithium atom, a sodium atom or a potassium atom.

The specific monomer usually has a polymerizable group, and the number of polymerizable groups is preferably from 1 to 3, more preferably 1.

The polymerizable group is preferably an ethylenically unsaturated group. More specifically, an acryloyl group, a methacryloyl group, a vinyl ether group, a vinyl ester group, a vinyl group, or an allyl group may be mentioned, and an acryloyl group, a methacryloyl group, a vinyl ester group, or a vinyl ether group is preferred.

As the specific monomer, the monomer represented by the formula (3) is preferred because formation of the fluorinated oligomer will be further suppressed.

CR$^{31}$R$^{32}$=CR$^{33}$-L$^3$-R$^{34}$    Formula (3)

In the formula (3), R$^{31}$ and R$^{32}$ are each independently a hydrogen atom or a fluorine atom.

R$^{33}$ represents a hydrogen atom, a fluorine atom, or an alkyl group which may be substituted by a fluorine atom. Among them, a hydrogen atom or a fluorine atom is preferred, whereby copolymerizability with TFE will be better.

Here, the "alkyl group which may be substituted by a fluorine atom" means an alkyl group which may have at least one hydrogen atom in the alkyl group substituted by a fluorine atom.

The number of carbon atoms in the alkyl group which may be substituted by a fluorine atom is preferably from 1 to 3, more preferably 1.

L$^3$ represents a single bond or a divalent linking group. Of these, a single bond is preferred, whereby copolymerizability with TFE will be better.

The divalent linking group may, for example, be a divalent hydrocarbon group (which may be a divalent saturated hydrocarbon group, a divalent aromatic hydrocarbon group, an alkenylene group, or an alkynylene group; the divalent saturated hydrocarbon group may be linear, branched or cyclic, and for example, an alkylene group may be mentioned; the number of carbon atoms is preferably from 1 to 20; and the divalent aromatic hydrocarbon group preferably has from 5 to 20 carbon atoms, for example, a phenylene group may be mentioned; other than these, it may be a C$_{2-20}$ alkenylene group or a 02-20 alkynylene group), a divalent heterocyclic group, —O—, —S—, —SO$_2$—, —C(O)—, —Si(R$^a$)$_2$—, —N(R$^b$)—, and a group in which two or more of these are combined. Here, R$^a$ represents an alkyl group (preferably having from 1 to 10 carbon atoms) or a phenyl group. R$^b$ represents a hydrogen atom or an alkyl group (preferably having from 1 to 10 carbon atoms).

The above-mentioned group in which two or more of these are combined, may, for example, be —OC(O)—, —C(O)N(R$^b$)—, an alkylene group-O-alkylene group, an alkylene group-OC(O)-alkylene group, or an alkylene group-Si(R$^a$)$_2$-phenylene group-Si(R$^a$)$_2$.

Further, the above divalent hydrocarbon group may have a substituent. The substituent may, for example, be a halogen atom (e.g. a fluorine atom or a chlorine atom). That is, a hydrogen atom in the above divalent hydrocarbon group may be substituted by a halogen atom.

R$^{34}$ represents a group represented by the above formula (A) or a group represented by the above formula (B).

As the monomer represented by the formula (3), at least one monomer selected from the group consisting of a monomer represented by the formula (3-1), a monomer represented by the formula (3-2), a monomer represented by the formula (3-3), a monomer represented by the formula (3-4), the monomer represented by the formula (3-5) and the monomer represented by the formula (3-6), is preferred, and a monomer represented by the formula (3-1) is more preferred.

CR$^{31}$R$^{32}$=CR$^{33}$—R$^{34}$    Formula (3-1)

CR$^{31}$R$^{32}$=CR$^{33}$—(CF$_2$)$_{m1}$—R$^{34}$    Formula (3-2)

CR$^{31}$R$^{32}$=CR$^{33}$—(CF$_2$C(CF$_3$)F)$_{m2}$—R$^{34}$    Formula (3-3)

CR$^{31}$R$^{32}$=CR$^{33}$—O—(CFR$^{35}$)$_{m3}$—R$^{34}$    Formula (3-4)

CR$^{31}$R$^{32}$=CR$^{33}$—O—(CF$_2$CFR$^{35}$O)$_{m4}$—CF$_2$CF$_2$—R$^{34}$    Formula (3-5)

CR$^{31}$R$^{32}$=CR$^{33}$—CF$_2$—O—(CF(CF$_3$)CF$_2$O)$_{m5}$—CF(CF$_3$)—R$^{34}$    Formula (3-6)

In the formulas (3-1) to (3-6), the definitions of $R^{31}$ to $R^{34}$ are as described above.

In the formula (3-2), m1 represents an integer of from 1 to 10.

In the formula (3-3), m2 represents an integer of from 1 to 5.

In the formula (3-4), m3 represents an integer of from 1 to 10. $R^{35}$ represents a fluorine atom or $CF_3$.

In the formula (3-5), m4 represents an integer of from 1 to 10. The definition of $R^{35}$ is as described above.

In the formula (3-6), m5 represents 0 or an integer of from 1 to 10.

A specific example of the specific monomer may be ammonium vinyl sulfonate.

As the specific monomer, one type may be used alone, or two or more types may be used in combination.

(Polymerization Initiator)

In step A2, a polymerization initiator may be used. That is, a polymerization initiator may be used at the time of the polymerization of TFE.

As the polymerization initiator to be used, the polymerization initiator as described in step A1 may be mentioned.

As the polymerization initiator, a mixed system of a persulfate and disuccinic acid peroxide is preferred, and a mixed system of ammonium persulfate and disuccinic acid peroxide is more preferred.

The amount of the polymerization initiator to be used, is preferably at least 0.10 mass %, more preferably from 0.10 to 1.5 mass %, further preferably from 0.20 to 1.0 mass %, to the whole amount of TFE to be supplied to the polymerization system.

(Stabilizing Aid)

In step A2, a stabilizing aid may be used.

As the stabilizing aid, paraffin wax, a fluorinated solvent or silicone oil is preferred, and paraffin wax is more preferred. The paraffin wax may be liquid, semi-solid or solid at room temperature. Of these, a saturated hydrocarbon having 12 or more carbon atoms is preferred. The melting point of paraffin wax is preferably from 40 to 65° C., more preferably from 50 to 65° C.

As the stabilizing aid, one type may be used alone, or two or more types may be used in combination.

(Others)

Further, in the step A2, monomers other than TFE and the specific monomer may be used within a range not to impair the effects of the present invention, but, the total amount of TFE to be used, is preferably at least 99.5 mass %, more preferably at least 99.8 mass %, to the total amount of the monomers to be used in step A2, from such a viewpoint that various properties of modified PTFE will be more excellent.

(Procedure of Step A2)

TFE and the specific monomer are charged to a reaction system (that is, a polymerization reaction container) by a conventional method. For example, TFE is continuously or intermittently charged to the reaction system (polymer 1) so that the polymerization pressure becomes to be a predetermined pressure. Further, for example, the specific monomer is dissolved in an aqueous medium, and the obtained solution is continuously or intermittently charged to the reaction system (polymer 1).

In a case where a polymerization initiator is to be used, the polymerization initiator may be added to the reaction system all at once, or may be added as divided in portions.

The amount of the specific monomer to be used to the whole amount of TFE, is at most 0.150 mass %. That is, the charged amount of the specific monomer to the whole charged amount of TFE is at most 0.150 mass %.

From the viewpoint of stability of the emulsion during polymerization, the amount of the specific monomer to be used to the whole amount of TFE, is preferably at most 0.100 mass %, more preferably at most 0.090 mass %. From the viewpoint of improving the molecular weight, the amount of the specific monomer to be used to the whole amount of TFE, is preferably at least 0.020 mass %, more preferably at least 0.030 mass %.

Further, in a case where two or more specific monomers are to be used, the total amount of the specific monomers to be used, may be within the above ranges.

The amount of the specific monomer to be used to the whole amount of TFE is preferably at most 0.150 mol %. That is, the charged amount of the specific monomer to the whole charged amount of TFE is preferably at most 0.150 mol %.

From the viewpoint of stability of the emulsion during polymerization, the amount of the specific monomer to be used to the whole amount of TFE, is preferably at most 0.100 mol %, more preferably at most 0.090 mol %. From the viewpoint of improving the molecular weight, the amount of the specific monomer to be used to the whole amount of TFE, is preferably at least 0.001 mol %, more preferably at least 0.005 mol %, further preferably at least 0.010 mol %.

In a case where two or more specific monomers are to be used, the total amount of the specific monomers to be used may be within the above ranges.

The polymerization temperature is preferably from 10 to 95° C., more preferably from 15 to 90° C. The polymerization pressure is preferably from 0.5 to 4.0 MPa, more preferably from 0.6 to 3.5 MPa. The polymerization time is preferably from 50 to 520 minutes, more preferably from 50 to 450 minutes, further preferably from 50 to 300 minutes.

Further, steps A1 and A2 may be continuously conducted in the same polymerization reaction container.

Further, in the production method of the present invention, the specific particles may be formed in step A1, and step A2 may be conducted before the non-fluorinated monomer is completely consumed in step A1.

By the above procedure, an aqueous dispersion (modified PTFE particle-containing aqueous dispersion) in which modified PTFE is dispersed in the form of particles, is obtainable. The concentration of modified PTFE particles in the aqueous dispersion is preferably from 10 to 45 mass %, more preferably from 10 to 30 mass %, further preferably from 10 to 25 mass %. Within the above range, modified PTFE particles in the aqueous dispersion can be more easily coagulated, and the cloudiness of the coagulated liquid can be suppressed.

The average primary particle size of modified PTFE particles is preferably from 100 to 500 nm, more preferably from 150 to 300 nm. When the average primary particle size is at least 100 nm, paste extrusion molding can be conducted under a low extrusion pressure, and a molded article having no surface waviness and excellent surface smoothness can be easily obtained. When the average primary particle size is at most 500 nm, voids between particles during extrusion are reduced, and thus extrusion stability will be excellent, and as a result, a molded product having excellent surface smoothness will be easily obtained.

The average primary particle size of modified PTFE particles corresponds to D50 measured by a laser scattering particle size distribution analyzer.

Modified PTFE obtainable by the above procedure comprises units based on TFE (hereinafter referred to also as TFE units), units based on the specific monomer, and units based on the non-fluorinated monomer.

Modified PTFE usually contains TFE units as the main component. The main component is meant that the content of TFE units is at least 99.700 mass %, preferably at least 99.900 mass %, to all units of modified PTFE. The content of TFE units is usually at most 99.999 mass %, to all units of modified PTFE.

The content of units based on the specific monomer is preferably from 0.020 to 0.150 mass %, more preferably from 0.030 to 0.100 mass %, to all units of modified PTFE.

Further, in a case where two or more specific monomers are to be used, the total content of units based on the respective specific monomers may be within the above ranges.

The content of units based on the non-fluorinated monomer is preferably from 10 to 500 mass ppm, more preferably from 10 to 200 mass ppm, further preferably from 20 to 200 mass ppm, particularly preferably from 30 to 150 mass ppm, to all units of modified PTFE.

Further, in a case where two or more non-fluorinated monomers are to be used, the total content of units based on the respective non-fluorinated monomers may be within the above ranges.

In the foregoing, the embodiment in which step A1 is conducted has been described, but another method may be used so long as the solution 1 can be prepared.

For example, a method may be used in which a separately prepared specific polymer is added to an aqueous medium to obtain solution 1, and then, polymerization of TFE is conducted in solution 1.

Second Embodiment

As a second embodiment of the method for producing modified PTFE, an embodiment having the following two steps may be mentioned.

Step B1: a step of mixing at least one member selected from the group consisting of a polyalkylene oxide compound and a hydrocarbon-containing surfactant, with an oxidizing agent, in an aqueous medium, to obtain a dispersion 2.

Step B2: a step of conducting copolymerization of TFE and a specific monomer, in the dispersion 2 under such a condition that the amount of the specific monomer to be used to the whole amount of TFE is at most 0.150 mass %, to obtain modified PTFE.

In the following, procedures of the respective steps will be described in detail.
<Step B1>
Step B1 is a step of mixing at least one member selected from the group consisting of a polyalkylene oxide compound and a hydrocarbon-containing surfactant (hereinafter referred to also as a "nucleation additive"), with an oxidizing agent, in an aqueous medium, to obtain a dispersion 2.

In the following, first, materials to be used in step B1 will be described in detail, and then, the procedure of step B1 will be described in detail.
(Polyalkylene Oxide Compound)
The polyalkylene oxide compound is a compound for forming nuclei (seeds) at the time of the polymerization of TFE and the specific monomer. In other words, it corresponds to a nucleation additive.

The polyalkylene oxide compound is a compound containing a polyalkylene oxide chain, and the polyalkylene oxide chain may, for example, be a polymethylene oxide chain, a polyethylene oxide chain, a polypropylene oxide chain, or a polytetramethylene oxide chain.

The polyalkylene oxide compound preferably has a surface tension in water of greater than about 40 dynes/cm at a concentration of 1,000 ppm. The surface tension is more preferably greater than about 42 dynes/cm, further preferably greater than about 45 dynes/cm. The above surface tension is preferably at most about 73 dynes/cm.

The number average molecular weight of the polyalkylene oxide compound is preferably from 50 to 2,000, more preferably from 100 to 1,500, further preferably from 150 to 1,300.

From such a viewpoint that formation of a fluorinated oligomer is more suppressed, as the polyalkylene oxide compound, a compound represented by the formula (2) is preferred

In the formula (2), $R^{21}$ and $R^{22}$ are each independently a hydrogen atom, an alkyl group, an acryloyl group, or a methacryloyl group.

$L^2$ represents a $C_{1-4}$ alkylene group and may be linear or branched.

n represents from 1 to 50.

Specific examples of the polyalkylene oxide compound include polyethylene glycol, polyethylene glycol acrylate, polyethylene glycol methacrylate, polyethylene glycol methyl ether, polyethylene glycol dimethyl ether, polyethylene glycol butyl ether, polypropylene glycol, polypropylene glycol acrylate, polypropylene glycol methacrylate, polypropylene glycol dimethacrylate, polypropylene glycol methyl ether, polypropylene glycol dimethyl ether, polypropylene glycol butyl ether, polypropylene glycol dimethacrylate, and polytetramethylene glycol.

As the polyalkylene oxide compound, one type may be used alone, or two or more types may be used in combination.
(Hydrocarbon-Containing Surfactant)
The hydrocarbon-containing surfactant is a surfactant containing a hydrocarbon. More specifically, at least some of monovalent substituents on carbon atoms are hydrogen atoms, and substitution by halogen atoms such as fluorine and chlorine atoms is also possible. In a preferred hydrocarbon-containing surfactant, at least 75%, preferably at least 85%, more preferably at least 95%, of monovalent substituents substituted on carbon atoms are hydrogen atoms.

As the hydrocarbon-containing surfactant, for example, a hydrocarbon surfactant and a siloxane surfactant may be mentioned.

The hydrocarbon surfactant means a surfactant which does not contain a silicon atom and does not contain a halogen atom such as a chlorine atom or a fluorine atom, since 100% of monovalent substituents substituted on carbon atoms are a hydrogen atom.

The siloxane surfactant means a hydrocarbon-containing surfactant having hydrophobic groups including a siloxane skeleton containing a large number of siloxane units.

As the hydrocarbon surfactant, an anionic hydrocarbon surfactant is preferred. An anionic hydrocarbon surfactant means a hydrocarbon surfactant having negatively charged hydrophilic moieties such as carboxylic acid groups, sulfonic acid groups, sulfuric acid groups, phosphonic acid groups and phosphoric acid groups, and hydrocarbon moieties such as alkyl groups as hydrophobic moieties.

An example of the anionic hydrocarbon surfactant may be a highly branched 010 tertiary carboxylic acid supplied as Versatic (registered trademark) 10 by Resolution Performance Products.

Other examples of the anionic hydrocarbon surfactant may be sodium linear alkyl polyether sulfonates supplied as Avanel (registered trademark) S series by BASF.

As the anionic hydrocarbon surfactant, an anionic hydrocarbon surfactant represented by the formula (4) is also preferred.

$$R^{41}\text{-}L^4\text{-}M \qquad \text{Formula (4)}$$

$R^{41}$ represents an alkyl group. The alkyl group may be linear, branched or cyclic, and is preferably linear. The number of carbon atoms in the alkyl group is, for example, from 6 to 20.

$L^4$ represents $-ArSO_3^-$, $-SO_3^-$, $-SO_4^-$, $-PO_3^-$, $-PO_4^-$ or $-COO^-$. Here, Ar represents an arylene group.

M represents a monovalent cation. The monovalent cation may, for example, be $H^+$, $Na^+$, $K^+$ or $NH_4^+$.

As a specific example of the anionic hydrocarbon surfactant represented by the formula (4), sodium dodecyl sulfate may be mentioned.

As another example of the anionic hydrocarbon surfactant, sulfosuccinate surfactant Lankropol (registered trademark) K8300 available from Akzo Nobel Surface Chemistry LLC. may be mentioned.

As the hydrocarbon surfactant, a nonionic hydrocarbon surfactant is also preferred. The nonionic hydrocarbon surfactant has no charged groups, but has a hydrophobic portion, which is often a long chain hydrocarbon. The hydrophilic portion of the nonionic hydrocarbon surfactant may be a water-soluble functional group such as a polyethylene oxide chain obtainable from the polymerization of ethylene oxide.

As the nonionic hydrocarbon surfactant, block copolymers having various types of polyalkylene oxide blocks, such as polyethylene oxide and polypropylene oxide, may be mentioned.

As suitable nonionic hydrocarbon surfactants, the surfactants described in paragraphs 0043 to 0052 of JP-A-2016-537499 may be mentioned.

As suitable siloxane surfactants, the surfactants described in U.S. Pat. No. 6,841,616 (Wille et al.) and U.S. Pat. No. 7,977,438 (Brothers et al.) may be mentioned.

(Oxidizing Agent)

The oxidizing agent may, for example, be a hydrogen peroxide and a polymerization initiator.

As the polymerization initiator, the compounds exemplified as the polymerization initiator described in the above step A1, may be mentioned. As the polymerization initiator, a persulfate is preferred, and ammonium persulfate or potassium persulfate is more preferred.

As the aqueous medium, the aqueous medium to be used in step A1 may be mentioned.

(Procedure of Step B1)

In step B1, the nucleation additive and the oxidizing agent are mixed in an aqueous medium to obtain a dispersion 2. In other words, in this step, in an aqueous medium, the nucleation additive is exposed to the oxidizing agent.

When the nucleation additive and the oxidizing agent are mixed in an aqueous medium, a dispersion liquid 2 in which lipophilic nucleation sites are dispersed in the aqueous medium is obtainable. More specifically, when a nucleating additive such as a polyalkylene oxide compound or a hydrocarbon-containing surfactant is mixed with an oxidizing agent, the hydrophilic portions of the nucleating additive are decomposed, and the hydrophobic portions of the nucleating additive become to be lipophilic nucleation sites. The lipophilic nucleation sites will be dispersed in the aqueous medium, which makes it possible to finely disperse the fluoropolymer at these sites.

Since the lipophilic nucleation sites are excellent in affinity with TFE, polymerization of TFE is likely to readily proceed in the dispersion 2 containing the lipophilic nucleation sites. That is, the lipophilic nucleation sites can be a place for a hydrophobic environment for polymerization of TFE.

The amount of the nucleation additive to be used, is preferably from 0.1 to 50 mass ppm, more preferably from 0.5 to 25 mass ppm, to the whole mass of the aqueous medium.

The amount of the oxidizing agent to be used, is preferably from 0.5 to 100 mass ppm, more preferably from 0.5 to 50 mass ppm, to the whole mass of the aqueous medium.

The temperature at which the nucleation additive and the oxidizing agent are mixed, is preferably from 20 to 120° C., more preferably from 40 to 120° C.

The mixing time for mixing the nucleation additive and the oxidizing agent is preferably from 0.05 to 1.00 hour.

It is preferred to add the water-soluble inorganic salt to the aqueous medium before or during the mixing of the nucleation additive and the oxidizing agent. Addition of the water-soluble inorganic salt is useful to increase the number of fluoropolymer particles to be formed during nucleation.

The amount of the water-soluble inorganic salt to be used, is preferably from 0.01 to 80 mass ppm, more preferably from 1 to 50 mass ppm, to the whole mass of the aqueous medium.

As the water-soluble inorganic salt, for example, sodium sulfite, sodium hydrogen sulfite, sodium chloride, potassium sulfite, potassium hydrogen sulfite, potassium carbonate, ammonium oxalate, sodium tetraborate, sodium acetate, ammonium carbonate, ammonium dihydrogen phosphate, or diammonium phosphate, may be mentioned, a sulfite is preferred, and sodium sulfite or ammonium sulfite is more preferred.

<Step B2>

Step B2 is a step of conducting copolymerization of TFE and the specific monomer in the dispersion 2 under such a condition that the amount of the specific monomer to be used to the whole amount of TFE is at most 0.150 mass %, to obtain modified PTFE.

In this step, the same procedure as step A2 as described above is conducted except that the dispersion 2 is used instead of the dispersion 1, and therefore, the description thereof will be omitted here.

Various properties of modified PTFE obtainable by step B2 are as described above for the various properties of modified PTFE obtainable by step A2. However, modified PTFE obtained in step B2 does not contain units based on a non-fluorinated monomer.

<Modified PTFE Powder>

As a method for obtaining modified PTFE powder (modified PTFE fine powder) composed of modified PTFE particles from the aqueous dispersion containing modified PTFE particles, for example, a method of coagulating modified PTFE particles may be mentioned.

Specifically, after adjusting the temperature of the aqueous dispersion to from 5 to 35° C. by e.g. diluting with water so that the concentration of modified PTFE in the aqueous dispersion containing modified PTFE particles becomes to be from 8 to 25 mass %, the aqueous dispersion is vigorously stirred to coagulate modified PTFE particles. At that time, the pH may be adjusted as the case requires. Further, a coagulation aid such as an electrolyte or a water-soluble organic solvent may be added to the aqueous dispersion.

After that, suitable stirring is conducted to separate the coagulated modified PTFE particles from water, and the obtained wet powder (wet fine powder) is coagulated and sized as the case requires, and then dried as the case requires. As a result, modified PTFE powder is obtainable.

The above drying is conducted in a state where the wet powder does not flow so much, preferably in a stationary state. The drying method may, for example, be vacuum drying, high frequency drying, or hot air drying.

The drying temperature is preferably from 10 to 300° C., more preferably from 100 to 300° C.

Particularly, it is preferred to dry an undried modified PTFE powder in an atmosphere containing ammonia. Here, an atmosphere containing ammonia means an atmosphere in which ammonia gas can contact the undried modified PTFE powder. For example, it means an atmosphere containing ammonia gas, or an atmosphere in which ammonia or a compound that generates ammonia is dissolved in water containing the undried modified PTFE powder, and ammonia gas is generated by e.g. heating.

The compound that generates ammonia may, for example, be an ammonium salt or urea. Such a compound will decompose by heating and will generate ammonia gas.

By drying the undried modified PTFE powder under an atmosphere containing ammonia, the paste extrusion pressure of the modified PTFE powder can be lowered without impairing the physical properties.

The modified PTFE powder of the present invention has units based on the monomer having a polar group in an amount of from 0.005 to 0.150 mol % to units based on tetrafluoroethylene. The units based on the monomer having a polar group is more preferably from 0.010 to 0.100 mol %.

The standard specific gravity (SSG) of the modified PTFE powder is at most 2.230, preferably from 2.130 to 2.230, more preferably from 2.135 to 2.220, further preferably from 2.135 to 2.210. SSG is used as a measure for a relative molecular weight, and the lower the value, the higher the molecular weight.

Modified PTFE obtainable by step A1 and step A2 may be a polymer having all of TFE units, units based on the specific monomer and units based on the non-fluorinated monomer, or it may be a mixture of a polymer having TFE units and units based on the specific monomer, and a polymer having units based on the non-fluorinated monomer.

<Molded Product>

The above-described modified PTFE may be suitably applied to paste extrusion molding.

By paste extrusion molding modified PTFE (particularly a modified PTFE powder), a desired molded product is obtainable.

Paste extrusion molding is a method in which a modified PTFE powder and a lubricant are mixed, so that the modified PTFE powder is made to have fluidity, and this is extrusion molded to form a molded product such as a film or a tube.

The mixing ratio of the lubricant may be suitably selected so that the modified PTFE powder will have fluidity. For example, when the total amount of the modified PTFE powder and the lubricant is 100 mass %, from 10 to 30 mass % is preferred, and from 15 to 20 mass % is more preferred.

As the lubricant, for example, naphtha or a petroleum hydrocarbon having a dry point of at least 100° C. is preferred.

To the mixture, an additive such as a pigment may be added for the purpose of coloring, and various fillers may be added for the purpose of imparting strength and conductivity.

The shape of the molded product may, for example, be a tube shape, a sheet shape, a film shape, or a fiber shape. Applications may, for example, be tubes, coatings for electric wires, sealing materials, porous membranes, or filters.

Further, the modified PTFE powder may be paste extruded to obtain an extruded bead, and the extruded bead may be stretched to obtain a stretched porous material of the modified PTFE. The stretching conditions may, for example, be a stretching ratio of at least 500% at a speed of from 5 to 1,000%/sec.

The shape of an article constituted by the stretched porous material may, for example, be a tube shape, a sheet shape, a film shape, or a fiber shape.

EXAMPLES

In the following, the present invention will be described in more detail with reference to Examples and Comparative Examples, but the present invention is not limited thereto.

Various measuring methods and evaluation methods are as follows.

(A) Average Primary Particle Size (Nm) (Hereinafter Referred to Also as "PPS") of Modified PTFE Particles An aqueous dispersion of modified PTFE particles was used as a sample, and the measurement was made by using a laser scattering method particle size distribution analyzer (manufactured by Horiba, Ltd., trade name: "LA-920").

(B) Standard Specific Gravity (SSG)

Measured in accordance with ASTM D4895-04.

12.0 g of a sample (modified PTFE powder) was weighed and held in a cylindrical mold having an inner diameter of 28.6 mm at 34.5 MPa for 2 minutes. This was placed in an oven of 290° C. and heated at a rate of 120° C./hr. Further, after holding at 380° C. for 30 minutes, the temperature was lowered at a rate of 60° C./hr and held at 294° C. for 24 minutes. After the sample was kept in a desiccator of 23° C. for 12 hours, the specific gravity value of the sample at 23° C. against water was measured, and this was adopted as the standard specific gravity. The smaller the SSG value, the higher the molecular weight.

(C) Measurement of Extrusion Pressure

The modified PTFE powder (100 g) left at room temperature for at least 2 hours was placed in a glass bottle having an internal capacity of 500 mL, and lubricating oil (Isopar H (registered trademark), manufactured by Exxon) (21.7 g) was added and mixed for 3 minutes to obtain a mixture. After leaving the obtained mixture in a thermostat at 25° C. for 2 hours, under conditions of the reduction ratio (the ratio of the cross-sectional area at the entrance of the die to the cross-sectional area at the exit of the die) being 100 and the extrusion speed being 51 cm/min, paste extrusion was conducted at 25° C. through an orifice having a diameter of 2.5 cm, a land length of 1.1 cm, and an introduction angle of 30°, to obtain an extruded bead (string-like material). The pressure required for the extrusion at that time was measured and adopted as the extrusion pressure (unit: MPa).

(D) Measurement of Stress Relaxation Time

An extruded bead was obtained in the same manner as in the measurement of extrusion pressure, and this was dried at 230° C. for 30 minutes to remove the lubricant. Next, the extruded bead was cut in an appropriate length, and both ends were fixed so that a clamp interval became 3.8 cm, whereupon the bead was heated to 300° C. in an air circulation furnace. Subsequently, the extruded bead was stretched under conditions of a stretching speed of 1,000%/sec and a total stretching of 2,400% to prepare a sample for measuring the stress relaxation time. Both ends of this sample were fixed with a fixing tool and tightened to a total length of 25 cm. The stress relaxation time was obtained as the time required for the sample to break when left in an oven of 390° C.

(E) Measurement of Fluorinated Oligomer

A sample (modified PTFE powder) was subjected to Soxhlet extraction with ethanol for 5 hours, and the extract obtained by ethanol was subjected to LC/MS analysis, whereby mainly a group of $C_{6-34}$ $CF_2$ chain oligomer was quantified by using, as standard products, perfluorooctyl sulfonic acid and perfluorooctanoic acid. A case where the presence of the oligomer was confirmed was judged to be "present", and a case where the presence of the oligomer was not confirmed, was judged to be "absent".

Here, in the LC/MS analysis, Agilent 1260 series HPLC/6460MS was used, and as the column, cadenza CD-C18 2 mmφ×100 mm, 3 μm particle size, manufactured by Imtakt, was used. Further, at the time of the measurement, a gradient of an aqueous solution of ammonium acetate and methanol was applied.

Example 1

[Step A1]

Into a 100 L stainless steel autoclave, paraffin wax (1,500 g) and deionized (60 L) were charged. After purging the autoclave with nitrogen, the pressure was reduced, and n-butyl methacrylate (n-BMA) (1 g) and deionized water (0.5 L) were poured and charged into the autoclave. Here, the n-butyl methacrylate was charged so that the amount of the n-butyl methacrylate used became to be 0.011 mass % to the whole amount of TFE to be used later.

Next, the inside of the autoclave was kept under atmospheric pressure, and the solution in the autoclave was heated to 75° C. with stirring. Then, a solution of ammonium persulfate (0.053 g) as a polymerization initiator dissolved in deionized water (1 L) was injected into the autoclave to polymerize n-butyl methacrylate.

[Step A2]

After 10 minutes, the pressure was increased to 1.96 MPa with TFE, and a solution having ammonium persulfate (0.54 g) and disuccinic acid peroxide (concentration 80 mass %, rest being water) (53 g) dissolved in warm water (1 L) of about 70° C., was injected into the autoclave. After 939 seconds, the internal pressure in the autoclave dropped to 1.89 MPa. Here, the amount of the above polymerization initiators (ammonium persulfate and hydrous disuccinic acid peroxide) used, was 0.59 mass % to the whole amount of TFE.

Next, TFE was added so that the internal pressure in the autoclave was maintained at 1.96 MPa, and the polymerization of TFE was proceeded. After adding 1 kg of TFE, a solution having ammonium vinyl sulfonate (13.3 g) dissolved in deionized water (1.5 L) was supplied so that ammonium vinyl sulfonate became to be 0.60 g per 1 kg of TFE supplied, by conducting the supply of ammonium vinyl sulfonate while confirming the supplied TFE amount by a flow meter.

The reaction was terminated when the amount of TFE added reached 9 kg, and TFE in the autoclave was released to the atmosphere. The polymerization time was 99 minutes.

The obtained aqueous dispersion of modified PTFE was cooled, and the supernatant paraffin wax was removed. The recovery rate of wax was 56%. The solid content concentration (concentration of modified PTFE) of the aqueous dispersion was about 12 mass %. The average primary particle size of modified PTFE in the aqueous dispersion was 177 nm.

The obtained aqueous dispersion was adjusted to 20° C. and stirred to coagulate the modified PTFE particles to obtain a modified PTFE powder. Next, this modified PTFE powder was dried at 270° C. together with an aqueous solution of ammonium carbonate.

The obtained modified PTFE powder had an SSG of 2.182. The extrusion pressure was 22.3 MPa. The stress relaxation time was 92 seconds.

Further, in the obtained modified PTFE powder, no fluorinated oligomer was found.

Example 2

An aqueous dispersion of modified PTFE was obtained in accordance with the same procedure as above (Example 1) except that the amount of ammonium vinyl sulfonate added was changed from 0.60 g to 0.90 g per 1 kg of TFE to be supplied, and then, a modified PTFE powder was obtained.

Various evaluations are summarized in Table 1.

Example 3

An aqueous dispersion of modified PTFE was obtained in accordance with the same procedure as above (Example 1) except that the amount of n-butyl methacrylate used was changed from 1 g to 0.4 g, ammonium persulfate added after temperature adjustment was changed from 0.053 g to 0.11 g, and the amount of ammonium vinyl sulfonate added to 1 kg of TFE to be supplied was changed from 0.60 g to 0.79 g, and then, a modified PTFE powder was obtained.

Various evaluations are summarized in Table 1.

Example 4

An aqueous dispersion of modified PTFE was obtained in accordance with the same procedure as above (Example 1), except that 1 g of i-butyl methacrylate (i-BMA) was used instead of 1 g of n-butyl methacrylate, and then, a modified PTFE powder was obtained.

Various evaluations are summarized in Table 1.

Example 5

An aqueous dispersion of modified PTFE was obtained in accordance with the same procedure as above (Example 1) except that 1 g of vinyl methacrylate (VMA) was used instead of 1 g of n-butyl methacrylate, and the addition amount of ammonium vinyl sulfonate was changed from 0.60 g to 0.62 g per 1 kg of TFE to be supplied, and then, a modified PTFE powder was obtained.

Various evaluations are summarized in Table 1.

Example 6

[Step B1]

In a 100 L stainless steel autoclave, paraffin wax (1,500 g) and deionized (60 L) were charged. After purging the autoclave with nitrogen, the pressure was reduced, and PEG1000 (number average molecular weight: 1000, polyethylene glycol) (0.39 g) and deionized water (0.5 L) were poured and charged to the autoclave. Here, the n-butyl methacrylate was charged so that the amount of the n-butyl methacrylate used became to be 0.011 mass % to the whole amount of TFE to be used later.

Next, the inside of the autoclave was kept under atmospheric pressure, and the solution in the autoclave was heated to 75° C. with stirring. Then, a solution having ammonium persulfate (0.053 g) as an oxidizing agent dissolved in deionized water (1 L), was injected to the autoclave to polymerize n-butyl methacrylate.
[Step B2]

After 10 minutes, the pressure was increased to 1.96 MPa with TFE, and a solution having ammonium persulfate (0.54 g) and disuccinic acid peroxide (concentration 80 mass %, rest being water) (53 g) as polymerization initiators dissolved in warm water (1 L) of about 70° C. was injected to the autoclave. After 939 seconds, the internal pressure in the autoclave dropped to 1.89 MPa. Here, the amount of the above polymerization initiators (ammonium persulfate and hydrous disuccinic acid peroxide) used, was 0.59 mass % to the whole amount of TFE.

Next, TFE was added so that the internal pressure in the autoclave was maintained at 1.96 MPa, and the polymerization of TFE was proceeded. After adding 1 kg of TFE, a solution having ammonium vinyl sulfonate (13.3 g) dissolved in deionized water (1.5 L) was supplied so that ammonium vinyl sulfonate became to be 0.59 g per 1 kg of TFE to be supplied, by supplying ammonium vinyl sulfonate while confirming the supplied TFE amount by a flow meter.

When the amount of TFE added reached 9 kg, the reaction was terminated, and TFE in the autoclave was released to the atmosphere. The polymerization time was 99 minutes.

The obtained modified PTFE aqueous dispersion was cooled, and the supernatant paraffin wax was removed. The recovery rate of wax was 57%. The solid content concentration (concentration of modified PTFE) of the aqueous dispersion was about 12 mass %. The average primary particle size of modified PTFE in the aqueous dispersion was 173 nm.

The obtained aqueous dispersion was adjusted to 20° C. and stirred to coagulate the modified PTFE particles to obtain a modified PTFE powder. Next, this modified PTFE powder was dried at 270° C. together with an aqueous solution of ammonium carbonate.

The obtained modified PTFE powder had an SSG of 2.182. The extrusion pressure was 23.5 MPa. The stress relaxation time was 88 seconds.

Further, in the obtained modified PTFE powder, no fluorinated oligomer was found.

Various evaluations are summarized in Table 1.

Example 7

An aqueous dispersion of modified PTFE was obtained in accordance with the same procedure as above (Example 1), except that 1 g of i-butyl methacrylate (i-BMA) was used instead of 1 g of n-butyl methacrylate, ammonium persulfate added after temperature control was changed from 0.053 g to 0.11 g, and the added amount of ammonium vinyl sulfonate to 1 kg of TFE to be supplied, was changed from 0.60 g to 1.1 g, and then, a modified PTFE powder was obtained.

Various evaluations are summarized in Table 1.

Example 8

An aqueous dispersion of modified PTFE was obtained in accordance with the same procedure as above (Example 4) except that the time to enter [Step A2] subsequent to [Step A1] was changed from after 10 minutes to after 30 minutes, and then, a modified PTFE powder was obtained.

Various evaluations are summarized in Table 1.

Example 9

An aqueous dispersion of modified PTFE was obtained in accordance with the same procedure as above (Example 8), except that 0.053 g of ammonium persulfate as a polymerization initiator in [Step A1] was changed to 0.11 g, and then, a modified PTFE powder was obtained.

Various evaluations are summarized in Table 1.

Example 10

An aqueous dispersion of modified PTFE was obtained in accordance with the same procedure as above (Example 7) except that the supply of 0.60 g of ammonium vinyl sulfonate in [Step A2] was changed to 0.43 g of ammonium acrylate, and then, a modified PTFE powder was obtained.

Various evaluations are summarized in Table 1.

Comparative Example 1

An aqueous dispersion of modified PTFE was obtained in accordance with the same procedure as above (Example 6) except that by using sodium lauryl sulfate (SLS) instead of ammonium vinylsulfonate, sodium lauryl sulfate was supplied so that the supply amount of SLS became to be 1.48 g per 1 kg of TFE to be supplied, while confirming the supply amount of TFE by a flowmeter, and the drying temperature was changed from 270° C. to 220° C., and then, a modified PTFE powder was obtained.

Here, in the modified PTFE powder obtained, there was a distribution of a group of fluorinated oligomers (H(CF$_2$CF$_2$)$_n$SO$_3$H (n=3 to 16)) with a peak in the vicinity of n=9 or 10, and a total of 230 ppm was detected.

In Table 1, the column for "SLS (g/TFEkg)" represents the amount of SLS added to 1 kg of TFE to be supplied.

The column for "APS (g)" represents the amount of ammonium persulfate used after temperature adjustment.

"Amount (mass %) of non-fluorinated monomer" represents the proportion (used mass proportion) of the amount of the non-fluorinated monomer used to the whole amount of TFE.

"Amount (mass ppm) of PEG" represents the proportion of the amount of PEG1000 used to the whole mass of the aqueous medium.

"Amount (mass %) of specific monomer" represents the proportion (used mass proportion) of the amount of the specific monomer used to the whole amount of TFE.

"Amount (mol %) of non-fluorinated monomer" represents the proportion (mol proportion) of the amount of the non-fluorinated monomer used to the whole amount of TFE.

"Amount (mol %) of specific monomer" represents the proportion (mol proportion) of the amount of the specific monomer used to the whole amount of TFE.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|
| n-BMA (g) | 1 | 1 | 0.4 | | | | | | | | |
| i-BMA (g) | | | | 1 | | | 1 | 1 | 1 | 1 | |
| VMA (g) | | | | | 1 | | | | | | |
| PEG1000 (g) | | | | | | 0.39 | | | | | 0.39 |
| SLS (g/TFEkg) | | | | | | | | | | | 1.48 |
| APS (g) | 0.053 | 0.053 | 0.11 | 0.053 | 0.053 | 0.053 | 0.11 | 0.053 | 0.11 | 0.11 | 0.053 |
| Amount (mass %) of non-fluorinated monomer | 0.11 | 0.11 | 0.004 | 0.11 | 0.11 | — | 0.11 | 0.11 | 0.11 | 0.11 | — |
| Amount (mass ppm) of PEG | — | — | — | — | — | 6.5 | — | — | — | — | 6.5 |
| Amount (mass %) of specific monomer | 0.060 | 0.090 | 0.079 | 0.060 | 0.062 | 0.059 | 0.110 | 0.060 | 0.060 | 0.043 | — |
| Amount (mol %) of non-fluorinated monomer | 0.008 | 0.008 | 0.003 | 0.008 | 0.010 | — | 0.008 | 0.008 | 0.008 | 0.008 | — |
| Amount (mol %) of specific monomer | 0.048 | 0.072 | 0.063 | 0.048 | 0.050 | 0.047 | 0.088 | 0.048 | 0.048 | 0.048 | — |
| Polymerization time (min.) | 99 | 110 | 116 | 101 | 103 | 104 | 116 | 105 | 102 | 96 | 78 |
| Wax recovery rate (%) | 56 | 41 | 24 | 58 | 54 | 57 | 30 | 62 | 62 | 21 | 96 |
| Average primary particle size (nm) | 177 | 180 | 192 | 180 | 178 | 173 | 176 | 174 | 181 | 175 | 145 |
| Standard specific gravity | 2.182 | 2.179 | 2.181 | 2.183 | 2.184 | 2.182 | 2.182 | 2.177 | 2.179 | 2.183 | 2.197 |
| Extrusion pressure (MPa) | 22.3 | 20.6 | 19.6 | 22.9 | 21.2 | 23.5 | 20.8 | 22.8 | 21.6 | 22.1 | 21.6 |
| Stress relaxation time (second) | 92 | 104 | 103 | 98 | 97 | 88 | 87 | 91 | 96 | 66 | 14 |
| Presence or absence of fluorinated oligomers | Absent | Absent | Absent | Absent | Absent | Absent | Absent | Absent | Absent | Absent | Present |

As shown in Table 1, according to the production method of the present invention, modified PTFE (an aqueous dispersion of modified PTFE particles) can be efficiently produced without formation of a fluorinated oligomer.

This application is a continuation of PCT Application No. PCT/JP2019/017673, filed on Apr. 25, 2019, which is based upon and claims the benefit of priority from Japanese Patent Application No. 2018-087280 filed on Apr. 27, 2018. The contents of those applications are incorporated herein by reference in their entireties.

What is claimed is:

1. A method for producing modified polytetrafluoroethylene, which comprises conducting copolymerization of tetrafluoroethylene and a monomer having a polar group, in a dispersion 1 comprising a polymer containing units based on a non-fluorinated monomer, and an aqueous medium, under such a condition that the amount of the monomer having a polar group to be used, is at most 0.150 mass % to the whole amount of tetrafluoroethylene to be supplied to the polymerization system.

2. The method for producing modified polytetrafluoroethylene according to claim 1, wherein the polar group is a group represented by the formula (A) or a group represented by the formula (B), $$\text{—SO}_3\text{M} \quad \text{Formula (A)}$$

$$\text{—COOM} \quad \text{Formula (B)}$$

in the formula (A) and the formula (B), M represents a hydrogen atom, $NH_4$ or an alkali metal atom.

3. The method for producing modified polytetrafluoroethylene according to claim 2, wherein the monomer having a polar group is a monomer represented by the formula (3), $$CR^{31}R^{32}=CR^{33}\text{-}L^3\text{-}R^{34} \quad \text{Formula (3)}$$

in the formula (3), $R^{31}$ and $R^{32}$ are each independently a hydrogen atom or a fluorine atom, $R^{33}$ represents a hydrogen atom, a fluorine atom or an alkyl group which may be substituted by a fluorine atom, $L^3$ represents a single bond or a divalent linking group, and $R^{34}$ represents a group represented by the above formula (A) or the above formula (B).

4. The method for producing modified polytetrafluoroethylene according to claim 1, wherein in the aqueous medium, polymerization of the non-fluorinated monomer is conducted, and then in the dispersion 1 comprising the polymer containing units based on the non-fluorinated monomer and the aqueous medium, copolymerization of the tetrafluoroethylene and the monomer having a polar group is conducted.

5. The method for producing modified polytetrafluoroethylene according to claim 1, wherein in the non-fluorinated monomer is a monomer represented by the formula (1), $$CH_2=CR^{11}\text{-}L^1\text{-}R^{12} \quad \text{Formula (1)}$$

in the formula (1), $R^{11}$ represents a hydrogen atom or an alkyl group, $L^1$ represents a single bond, —CO—O—*, —O—CO—* or —O—, * represents the bonding position to $R^{12}$, and $R^{12}$ represents a hydrogen atom, an alkyl group, an alkenyl group or a nitrile group, provided that when $L^1$ is a single bond, $R^{12}$ is a nitrile group.

6. The method for producing modified polytetrafluoroethylene according to claim 1, wherein at the time of the copolymerization of the tetrafluoroethylene and the monomer having a polar group, a polymerization initiator is used, and the amount of the polymerization initiator to be used, is at least 0.10 mass % to the whole amount of tetrafluoroethylene to be supplied to the polymerization system.

7. The method for producing modified polytetrafluoroethylene according to claim 1, wherein the amount of the monomer having a polar group to be used, is at most 0.150 mol % to the whole amount of tetrafluoroethylene to be supplied to the polymerization system.

8. A method for producing modified polytetrafluoroethylene, which comprises conducting copolymerization of tetrafluoroethylene and a monomer having a polar group, in a dispersion 2 obtainable by mixing at least one member selected from the group consisting of a polyalkylene oxide compound and a hydrocarbon-containing surfactant, with an oxidizing agent, in an aqueous medium,
under such a condition that the amount of the monomer having a polar group to be used, is at most 0.150 mass % to the whole amount of tetrafluoroethylene to be supplied to the polymerization system, to obtain modified polytetrafluoroethylene.

9. The method for producing modified polytetrafluoroethylene according to claim 8, wherein copolymerization of the tetrafluoroethylene and the monomer having a polar group is conducted in the dispersion 2, and
the polyalkylene oxide compound is a compound represented by the formula (2)

$$R^{21}-(O-L^2)_n-O-R^{22} \qquad \text{Formula (2)}$$

in the formula (2), $R^{21}$ and $R^{22}$ are each independently a hydrogen atom, an alkyl group, an acryloyl group or a methacryloyl group, $L^2$ represents a $C_{1-4}$ alkylene group, and n represents from 1 to 50.

10. The method for producing modified polytetrafluoroethylene according to claim 8, wherein a polymerization initiator is used at the time of the copolymerization of the tetrafluoroethylene and the monomer having a polar group, and
the amount of the polymerization initiator to be used is at least 0.10 mass % to the whole amount of tetrafluoroethylene to be supplied to the polymerization system.

11. The method for producing modified polytetrafluoroethylene according to claim 8, wherein the amount of the monomer having a polar group to be used, is at most 0.150 mol % to the whole amount of tetrafluoroethylene to be supplied to the polymerization system.

12. A method for producing a modified polytetrafluoroethylene powder, which comprises producing an aqueous dispersion in which the modified polytetrafluoroethylene obtained by the method as defined in claim 1 is dispersed in the form of particles, and coagulating the particulate modified polytetrafluoroethylene to obtain a modified polytetrafluoroethylene powder.

13. A modified polytetrafluoroethylene powder, in which units based on a monomer having a polar group, are from 0.005 to 0.150 mol %, to units based on tetrafluoroethylene,
of which the standard specific gravity is at most 2.230, and
which contains substantially no $C_{6-34}$ fluorinated oligomer containing hydrophilic functional groups and no fluorinated surfactant.

14. A method for producing a stretched porous material, which comprises producing a modified polytetrafluoroethylene powder by the method as defined in claim 12, paste-extruding the modified polytetrafluoroethylene powder to obtain an extruded bead, and stretching the extruded bead to obtain a stretched porous material.

* * * * *